INVENTORS
John R. Parsons and
Hubert W. Van Ness.

United States Patent Office 2,701,852
Patented Feb. 8, 1955

2,701,852

LOW FREQUENCY SEAM WELDER CONTROL

John R. Parsons, Kenmore, and Hubert W. Van Ness, Buffalo, N. Y., assignors to Westinghouse Electric Corporation, East Pittsburgh, Pa., a corporation of Pennsylvania Application September 15, 1950, Serial No. 185,068

25 Claims. (Cl. 315—201)

Our invention relates to electric discharge apparatus and has particular relation to low frequency welding apparatus.

In application Serial No. 52,105, filed September 30, 1948, now Patent No. 2,508,467, to one of us and Edward C. Hartwig, a control for a low frequency seam welder is disclosed. This control includes a frequency determining circuit, shown in detail in Fig. 1, which measures out the duration of the low frequency pulses supplied for welding purposes.

While, for many purposes, the apparatus disclosed in the above-identified application operates satisfactorily, it lacks the flexibility demanded for universal application. For example, in the aircraft industry, the practice of welding air frames, particularly for military aircraft, has been adopted widely. This welding operation is covered by Defense Department specifications AN/W30 and AN/W31 which impose rigid limitations on any welded material submitted for acceptance. To meet these conditions, it is desirable that the welding apparatus be capable of supplying, at the will of an operator, welding current having a wide range of waveform and duration. It is also desirable that the apparatus be capable of delivering welding current pulses of either polarity continuously, or alternatively pulses of one polarity and pulses of the opposite polarity. The apparatus disclosed in the above-described application does not readily avail this flexibility.

The frequency determining circuit of the apparatus disclosed in the above-described application is also relatively complex in its operation. Operational servicing and maintenance costs present a serious problem.

It is accordingly an object of our invention to provide a control for a welder which shall afford the welding current flexibility demanded for universal use.

Another object of our invention is to provide a control for a low frequency welder which shall be readily adaptable for any reasonable use.

A further object of our invention is to provide a welding system which shall lend itself readily to the welding of materials over a wide range of composition and shall produce welds which shall be capable of meeting such rigorous demands as are imposed by the Department of Defense on the welding of air frames.

A specific object of our invention is to provide for a low frequency welder a frequency determining circuit of simple structure which shall require a minimum of servicing and maintenance.

In accordance with our invention, we provide a frequency determining circuit including a pair of discharge devices connected in opposite phase. From one of these devices when it is conductive, the pulses for initiating the welding current flow of one polarity are derived; from the other, the pulses for initiating the flow of the opposite polarity are derived. In the anode circuits of these devices, a pair of switches having a plurality of contacts are connected. The movable contacts of the switches are ganged so that the movable contacts move together. By operation of these movable contacts, the anode circuits of the two devices may be set so that, depending on the setting of the switches, one conducts to supply welding current of only one polarity while the other is non-conductive; the latter conducts to supply welding current only of its corresponding polarity while the former is non-conductive or both conduct to supply current alternately of both polarities.

With each of these main discharge devices, an auxiliary discharge device is associated. The auxiliary device is so connected in the grid circuit of its associated main device that when the auxiliary device is conductive, it prevents its associated main device from becoming conductive. The auxiliary devices are connected in a circuit such that one or the other of them is at any time conductive and the non-conductive device may be rendered conductive and when so rendered conductive, extinguish the conductive device and itself remain conductive.

The main devices are controlled from the secondary windings of a transformer. The primary of this transformer is supplied from an alternating current source through a half wave rectifier. When the rectifier is conductive, current pulses of one polarity are transmitted through the primary and potential pulses of one polarity and then the opposite polarity appear at the terminals of each of the secondaries. The secondaries are so connected in the control circuit of the main devices that one of the devices may be rendered conductive by the secondary potential pulses of one polarity while the other may be rendered conductive by the potential pulses of the opposite polarity. When the rectifier is conductive, that one of the main devices whose associated auxiliary device is non-conductive is rendered conductive. Depending on the setting of the switch, welding current of either polarity alone or of both polarities then flows.

The novel features that we consider characteristic of our invention are set forth with particularity in the appended claims. The invention itself, however, both as to its organization and its method of operation, together with additional objects and advantages thereof will be understood from the following description of a specific embodiment when read in connection with the accompanying drawings, in which:

Figure 1:
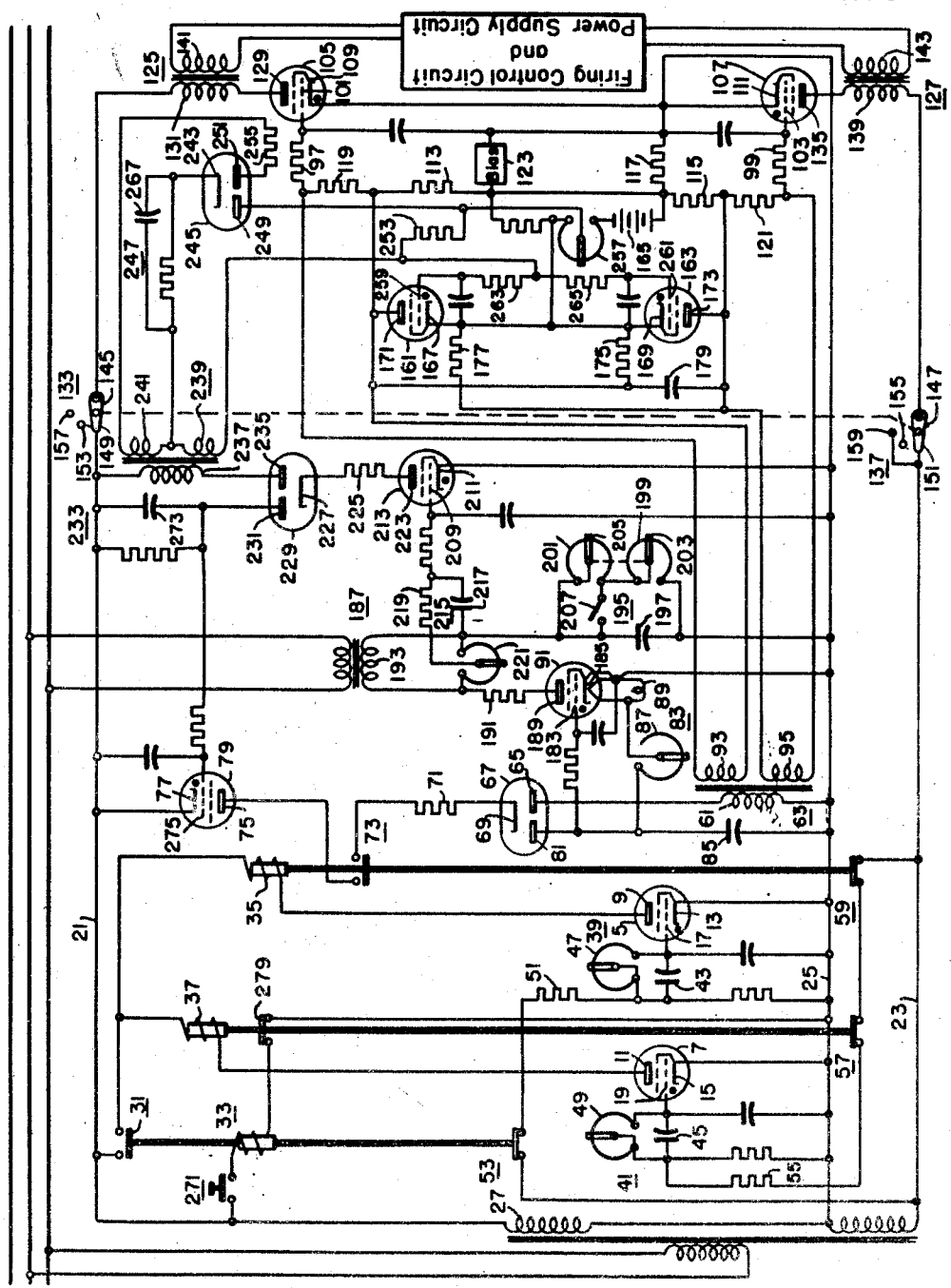
Figure 1 is a circuit diagram of a frequency determining circuit in accordance with our invention.

The welding current which flows in the apparatus in accordance with our invention is made up of trains of low frequency current pulses. The duration of the pulses of each train, the duration between pulses and the duration between successive trains may be set at the will of an operator. The polarity of the pulses in any train may also be set at the will of the operator. In the following discussion, we shall refer to the duration of each pulse of a train as the On time, the duration between successive pulses of the train as the Off time, the duration of a train of pulses as the Weld time and the duration between trains of pulses as the Pause time.

In the apparatus shown in the drawing, a number of discharge devices and a number of rectifiers are included. In accordance with the broader aspects of our invention, the discharge devices may be of any type, high vacuum or gaseous. In accordance with the preferred practice of our invention, these devices are thyratrons.

In the apparatus disclosed in Fig. 1, the Weld time is initiated by the conduction of a thyratron 5 and the Pause time is initiated by the conduction of a second thyratron 7. Each thyratron 5 and 7, respectively, has an anode 9 and 11, a cathode 13 and 15, and a control electrode or grid 17 and 19. The thyratrons 5 and 7 are supplied with power from three buses 21, 23 and 25 connected respectively, to the end taps and the intermediate tap of a secondary 27 of a supply transformer 29. The anode 9 of the Weld thyratron 5 may be connected to one bus 21 through the normally open contacts 31 of a relay 33 and through the exciting coil 35 of a relay which initiates the Weld time; the cathode 13 is connected to the intermediate bus 25. The anode 11 of the Pause thyratron 7 is adapted to be connected to the bus 21 through the normally open movable contacts 31 of the start relay 33 and the exciting coil 37 of a relay which initiates the Pause time; the cathode is also connected to the intermediate bus 25. With each thyratron 5 and 7, respectively, a timing network 39 and 41 is associated. Each network 39 and 41, respectively, consists of a capacitor 43 and 45 shunted by a voltage divider 47 and 49. One terminal of one network 39 is connected to the grid 17 of the Weld thyratron 5 and the other terminal is connected through a resistor 51 and normally closed contacts 53 of the start relay 33 to the remaining bus 23. One terminal of the other network 41 is connected to the grid 19 of the Pause thyratron 7 while the other is connected through a resistor 55 and normally closed contacts 57 and 59 of the Pause and Weld relays (35 and 37), respectively, to the remaining bus 23.

During the half periods when the anode of each of the thyratrons 5 and 7 is negative relative to the cathode, the capacitor 43 and 45 in each of the respective networks 39 and 41 is charged negative on the grid side from the lower bus 23 through the grid cathode circuit of its associated thyratron. Each of the thyratrons 5 and 7 is, therefore, initially non-conductive.

During the On time, current pulses of one polarity are delivered to the primary 61 of a control transformer 63. This primary is connected at one terminal to the intermediate bus 25 and at the other to an anode 65 of a double diode 67. The cathode 69 of the diode 67 is adapted to be connected to the bus 21 through a resistor 71, the normally open contacts 73 of the Weld relay (35) and the anode 75 and cathode 77 of a thyratron 79. The other anode 81 of the diode 67 is connected to the intermediate bus 25 through the Off time network 83. This network consists of a capacitor 85 shunted by a voltage divider 87 in series with the heater winding 89 of another thyratron 91.

Each of the secondaries 93 and 95, respectively, of the control transformer 63 is connected at one terminal through an associated resistor 97 and 99 to the grid 101 and 103 of an associated thyratron 105 and 107. The cathodes 109 and 111, respectively, of the latter thyratrons 105 and 107 are connected together and each of the remaining terminals of the secondaries 93 and 95 are connected to the common junction of the cathode through an associated resistor 113 and 115, respectively, and a common resistor 117. Each of the secondaries 93 and 95, respectively, is also shunted by an associated resistor 119 and 121. Across the common resistor 117, a bias 123 is connected so that both thyratrons 105 and 107 are maintained non-conductive in the absence of potential at the terminals of the secondaries 93 and 95, respectively.

Figure 2:
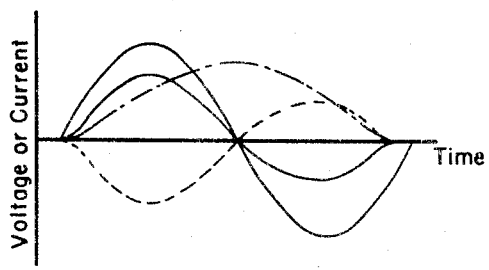
Fig. 2 is a graph illustrating the operation of the control transformer of Fig. 1.

The thyratrons 105 and 107 may be designated the main thyratrons. It is their function to supply the pulses which initiate the flow of welding current. One thyratron 105 initiating the flow of welding current of one polarity and the other (107) initiating the flow of welding current of the opposite polarity. The welding current is transmitted through output transformers 125 and 127, respectively, one associated with each of the main thyratrons. The anode 129 of one of the thyratrons 105 is connected through the primary 131 of its associated transformer 125 and selected contacts of a switch 133 to one bus 21. The anode 135 of the other thyratron 107 is connected to another bus 23 through selected contacts of another switch 137 and the primary 139 of the other transformer 127. The cathodes 109 and 111 of the thyratrons are connected to the intermediate bus 25. The secondaries 141 and 143 of the output transformers 125 and 127 are respectively connected to the associated components (117 and 119) of a firing control circuit such as is shown in Fig. 2 of application Serial No. 52,105.

Each of the switches 133 and 137, respectively, has a movable contact 145 and 147 and three fixed contacts 149 and 151, 153 and 155, and 157 and 159; the movable contact 145 or 147 moving over the three contacts 149, 153 and 157 or 151, 155 and 159 in each case in succession. The movable contacts 145 and 147 are ganged. The first and second fixed contacts 149 and 143 of one switch 145 are connected directly to its associated bus 21; the first and third contacts 151 and 159 of the other switch 147 are connected directly to its associated bus 23. The remaining contacts 157 and 155 respectively of each switch are open. When the contacts 145 and 147 are in the first position, the anodes 129 and 135 of both thyratrons 105 and 107, respectively, are thus connected to their associated buses 21 and 23, respectively. Both thyratrons are, thus, adapted to be rendered conductive in turn. Under such circumstances, the welding current is alternately of positive and negative polarity. When the movable contacts 145 and 147 are set in the second position, the anode 129 of one of the thyratrons 105 is connected to its associated bus 21 while the anode 135 of the other thyratron 105 is disconnected. Under such circumstances, the welding current pulses are of only one polarity. With the movable contacts 145 and 147 in the third position, the anode 129 of the first thryratron 105 is disconnected and the anode 135 of the second thyratron 107 is connected to its associated bus 23. Under such circumstances, the welding current is of the opposite polarity only.

An auxiliary thyratron 161 and 163, respectively, is associated with each of the main thyratrons 105 and 107. The auxiliary thyratrons are supplied from a direct current supply 165 which, in the usual practice of our invention, is derived from the main supply (not shown) through rectifiers (not shown). The positive terminal of the supply is connected to the junction of the resistors 113 and 115 connected to the secondaries 93 and 95; the negative terminal is connected to the junction of the cathodes 167 and 169, respectively, of the auxiliary thyratrons. The anode 171 of one thyratron 161 is connected to the remaining terminal of one of the resistors 113 and the anode 173 of the other to the remaining terminal of the other (115). A resistor 175 and 177, respectively, is connected between each anode 171 and 173 and the cathodes. A capacitor 179 is connected between the anodes 171 and 173.

When one of the thyratrons 161 or 163 is conductive, current flows through its associated resistor 113 or 115, respectively, in such a sense as to maintain the grid 101 or 103 of the associated main thyratron 105 or 107, respectively, negative relative to the cathodes 109 and 111. That one thyratron is accordingly incapable of being rendered conductive. Also, when one of the auxiliary thyratrons 161 or 163 is conductive, the capacitor 179 is charged in such a sense that the plate of the capacitor is connected to the anode 171 or 173, respectively, this thyratron is negative. When the other thyratron 163 or 161 is rendered conductive, the positive (other) plate of this capacitor 179 is connected through the latter thyratron directly to the cahodes 167 and 169 and the initially conductive thyratron 161 or 163 is rendered non-conductive. This flip-flop process would be facilitated by a small inductance connected in the anode circuits of the auxiliary thyratrons.

The Off timing network 83 is connected between the grid 183 and the cathode 185 of the thyratron 91 of which the heater winding 89 is in the Off network. Supply potential for this thyratron 91 is derived from the main supply through an auxiliary transformer 187. The anode 189 of this thyratron is connected through a resistor 191 to one terminal of the secondary 193 of the transformer; the other terminal is connected through a network 195 which we may designate as the On network to the cathode 185.

The On network consists of a capacitor 197 shunted by a pair of voltage dividers 199 and 201 having ganged movable arms 203 and 205, respectively. Across one of the voltage dividers 201, a shunting switch 207 is connected. The two voltage dividers 199 and 201 together are capable of determining the total duration of the discharge of the capacitor 197 and thus the total On time. The divider 201 adapted to be shunted determines the duration of the post-heat time which may be necessary in certain situations. It may be set for this time in any welding operation and may be shunted out where the post-heat current flow would perform no useful function.

The On network 195 is connected between the control electrode 209 and the cathode 211 of still another thyratron 213 through another network 215 consisting of a capacitor 217 shunted by a resistor 219 and a voltage divider 221 in series with a resistor. An alternating voltage displaced in phase by an amount fixed by the relationship of the resistors 219 and 221 to the capacitor 217 is thus superimposed on the On capacitor voltage in the control circuit of thyratron 213. The divider 221 determines the amplitude of this alternating voltage. The network 215 is set so that thyratron 213 fires at the proper instants in the half periods to assure that the desired number of cycles are counted precisely.

The anode 223 of the thyratron 213 is connected through a resistor 225 to the cathode 227 of a double diode 229. The anode 231 of the diode 229 is connected through a capacitor-resistor network 233 to the bus 21. The other anode 235 of the diode 229 is connected through the primary 237 of another transformer 239 to the same bus 21. The cathode 211 of the thyratron 213 is connected to the intermediate bus 25.

The secondary 241 of the transformer 239 is provided with a pair of terminal taps and an intermediate tap. The intermediate tap is connected to the cathode 243 of a double diode 245 through a capacitor-resistor network 247. The anodes 249 and 251, respectively, of the diode 245 are each connected to a terminal tap through a resistor 253 and 255. The terminal of resistor 253 connected to the anode 249 is connected directly to a voltage divider 257 in series with the direct current supply 165. The other terminal of the associated resistor 253 is connected to the control electrodes 259 and 261, respectively, of each of the auxiliary thyratrons 161 and 163 through an associated resistor 263 and 265.

When current flows through the resistor 253 connected to the double diode 245, potential is impressed between the control electrodes 259 and 261 and the cathodes 167 and 169 of each of the auxiliary thyratrons 161 and 163, respectively, in such a sense as to tend to render each conductive. However, one of the thyratrons is normally conductive and only the other is now rendered conductive. Once the latter is rendered conductive, it, in conjunction with the capacitor 179, renders the initially conductive thyratron non-conductive.

Current is supplied to the resistor 253 when the transformer 239 is energized. This condition arises during the half periods of the supply when the thyratron 213 is conductive. Under such circumstances, the current flows in succession through the sections 249—243 and 251—243 of the double diode 245 to charge the capacitor 267 connected to its cathode 243. The current decreases in magnitude as it flows. The components of the network 247 are so set that only the first current pulse transmitted is effective to render the non-conductive one of the auxiliary thyratrons 161 or 163 conductive.

When the main switch (not shown) is closed, one or the other of the auxiliary thyratrons 161 or 163 is rendered conductive by the transient potentials which are impressed in the circuit on the initial closing of the switch. Initially then, one of the main thyratrons 105 or 107 is incapable of being rendered conductive while the other is capable of being rendered conductive. Initially the On thyratron 91 is also conductive.

To initiate a welding operation, a manually operable switch 271 such as a foot switch is closed, closing the circuit through the exciting coil of the start relay 33. The normally open contacts 31 of this relay close, closing circuits from the bus 21 through the exciting coils 35 and 37 of the Weld and Pause relays, respectively. The normally closed contacts 53 of the start relay 33 also open, opening the charging circuit for the Weld network 39. The Weld capacitor 43 discharges during a predetermined time interval and thereafter the Weld thyratron 5 is rendered conductive.

When the Weld thyratron 5 is rendered conductive, the relay (35) is actuated and its lower normally closed contacts 59 are open, discontinuing the charging of the Pause capacitor 45. The latter capacitor begins to discharge and continues to discharge until the end of the weld interval. The normally open contact 73 of this Weld relay (35) close, rendering conductive the control thyratron 79. Current now flows through the primary 61 of the control transformer 63 and successive half waves of potential alternatively of positive and negative polarity are supplied at the terminals of the secondaries 93 and 95 of this transformer.

The operation of this transformer during one period of the supply is illustrated in Fig. 2 in which voltage and current are plotted vertically and time horizontally. The full-line sine wave curve represents the source potential. The dash-dot loop represents the unidirectional current through the primary. The distorted full-line wave represents the secondary voltage of secondary 93 assuming the grid (101) terminal positive and the cathode (109) terminal negative and the broken-line wave the corresponding voltage of secondary 95. The secondary voltages are thus made up of two full waves of potential which are substantially in phase with the opposite terminals 21 and 23, respectively, of the supply potential. The positive half wave of one of the waves is impressed between the grid 101 and the cathode 109 of one of the main thyratrons 105 while its anode 129 is positive; the positive half wave of the other wave is impressed during the succeeding half period between the grid 103 and the cathode 111 of the other thyratron 107 while its anode 135 is positive. The main thyratron 105 or 107 capable of being rendered conductive is thus rendered conductive by one of the other of the positive half waves. The conductive thyratron 105 or 107 supplies potential to its associated output transformer 125 or 127, respectively, which, in turn, operates to initiate the supply of welding current of one polarity. As the control thyratron 79 continues to conduct, the associated main thyratron 105 or 107 is rendered conductive during alternate half periods of the supply and the welding current is built up during the requisite number of 120° intervals of the supply.

While the control thyratron 79 is conductive, the Off capacitor 85 is also charged. This capacitor is charged to a negative potential at the beginning of the conductive half period (of thyratron 79) and impresses a cut-off biasing potential in the control circuit of the On thyratron 91; the On thyratron is immediately prevented from becoming conductive. The On capacitor 197 now begins to discharge and discharges during the On interval.

At the end of the On interval, the thyratron 213 is rendered conductive. The capacitor 273 in the network 233 connected to the anode 231 of the associated double diode 229 is now charged. The network 233 is connected between the grid 275 and the cathode 77 of the control thyratron 79 and the control thyratron is rendered non-conductive immediately following the charging of the capacitor 273. In addition, a current pulse is transmitted through the primary 237 of the transformer 239 and current is conducted through the resistor 253 in series with the double diode 245. A pulse is now impressed between the grids 259 and 261 and the cathodes 167 and 169 of the auxiliary thyratrons 161 and 163, respectively, to render the one of them which is non-conductive conductive and the other non-conductive. The main thyratron 105 or 107 which was conductive is now maintained non-conductive once the other main thyratron is adapted to be rendered conductive.

When the control thyratron 79 was rendered non-conductive, the supply of firing control potential to the main thyratrons 105 and 107 was interrupted and the one which was conductive was rendered non-conductive. Both thyratrons 105 and 107 now remain non-conductive until the inception of another On time. The supply of current to the Off capacitor 85 was also discontinued when thyratron 79 became non-conductive and this capacitor now discharges through the Off resistor 87. The discharge continues until at the end of the Off interval the control potential of the On thyratron 91 reaches a magnitude at which the latter becomes conductive.

The On capacitor 197 is now immediately charged, rendering the thyratron 213 non-conductive and the control thyratron 79 is rendered conductive. The supply of current through the control transformer 63 is then reinitiated and the Off capacitor 85 is again charged. The control thyratron 79 is rendered conductive at the beginning of its positive half period which is also the beginning of the half period for thyratron 91. Off capacitor 85 is sufficiently charged at the beginning of this positive half period to cut the thyratron 91 off before it can be rendered conductive. This object is accomplished by the proper phasing of the ripple potential introduced into the Off network by the heating coil 89. By the cooperation of the Off resistor 87 and the Off capacitor 85, the ripple is so timed that the On thyratron 91 is rendered conductive not at the zero instant in its positive half period, but at an instant delayed by a phase angle of approximately 30°. The On thyratron may thus be prevented from becoming conductive during any half period by the initiation of conductivity of the control thyratron 79 at the beginning of this half period. The conductive main thyratron 105 or 107 is now again rendered non-conductive and the above-described cycle again repeated.

The rendering conductive of the main valves and the supply of welding current in accordance with the setting of the ganged switch thus continues so long as the Weld relay (35) remains actuated.

Eventually, the Pause thyratron 7 becomes conductive and the Pause relay (37) is actuated. At one of the now open contacts 279 of the Pause relay, the circuit through the coil of the start relay 33 is now opened and the latter drops out. The normally open contact 31 of the start relay now opens, deenergizing the coils 35 and 37 of the Weld and Pause relays and causing the latter to drop out. When the Weld relay drops out, it opens its normally open contacts 73 and discontinues the supply of welding current. The normally closed contacts 53 of the start relay 33 also reclose, permitting the Weld capacitor 43 to charge. The normally closed contacts 59 and 57 of the Weld and Pause relays now close and the Pause capacitor 45 is charged. The apparatus is now reset and a second Weld-Pause cycle as described above is repeated if the start switch remains closed.

Figure 3:
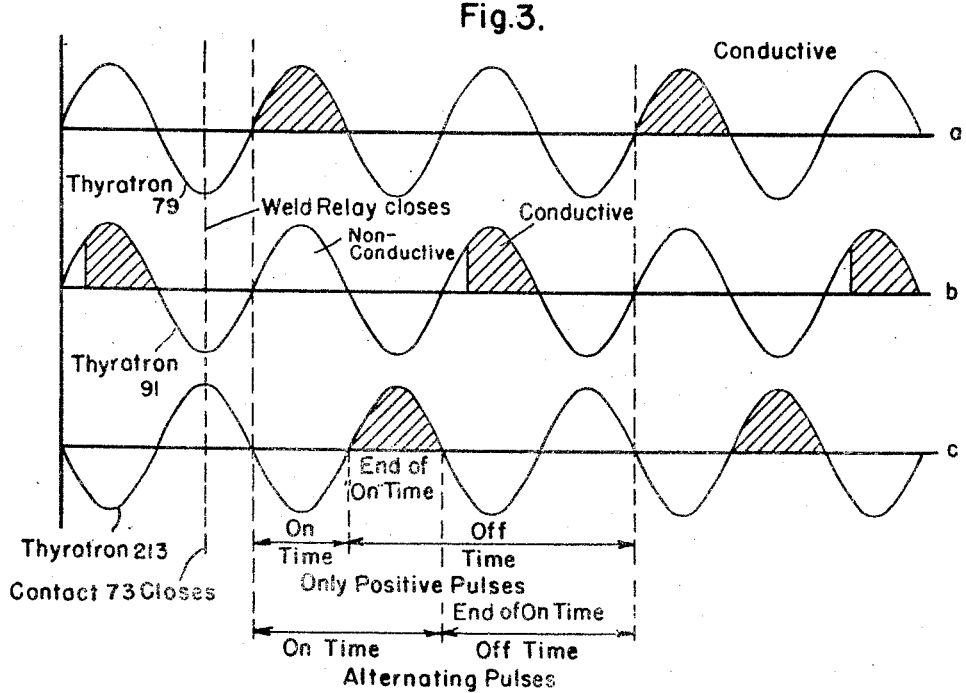
Fig. 3 is a graph illustrating the operation of the various discharge devices of Fig. 1.

In Fig. 3, graphs are presented of the operation of the control and On thyratrons 79 and 91 and the thyratron 213 controlled from the On thyratron. In each of plots *a*, *b* and *c* of Fig. 3, voltage is plotted vertically and time horizontally. The waves of plots *a*, *b*, and *c* represent, respectively, the anode potentials supplied to the thyratrons 79, 91 and 213 respectively. The shaded areas represent the intervals during which the corresponding thyratrons are conductive.

The graph is plotted for the setting of the On and Off networks for minimum On and Off time. Initially, the On thyratron 91 is conductive and the control thyratron 79 and thyratron 213 are non-conductive. Assume that the Weld relay contact 73 closes at an instant in the second half cycle as represented by the line immediately to the right of the ordinate on the graph. Following the closure of the contact of this relay at the beginning of the succeeding positive half period, the control valve 79 is rendered conductive for a half period as shown. When the control valve becomes conductive at the beginning of this half period, it immediately charges the Off capacitor 85. The On thyratron 91 is, now, prevented from becoming conductive. During the half period during which the control thyratron 79 is conductive, the On capacitor 195 discharges. At the beginning of the succeeding half periods when its anode potential is positive, the thyratron 213 is now rendered conductive. The capacitor 273 in the anode circuit of the thyratron 213 is then immediately charged and the control thyratron 79 is prevented from becoming conductive when its anode potential becomes positive at the beginning of the succeeding half periods. The Off capacitor 83 has now been discharging during a negative half period and at the instant when the ripples impressed in the control circuit of the On thyratron 91 are of sufficient magnitude to render the latter conductive, the latter becomes conductive. The above-described cycle is then again repeated.

The durations of the On time and the Off time of the frequency determining circuit are presented in Fig. 3. For the setting which Fig. 3 represents, the On time, with the switches 133 and 137 set so that welding current pulses of only one polarity are delivered, is one half period long and the Off time is three half periods long. With the switches 133 and 137 set so that the welding current is of the low frequency alternating type, the On time is two hlaf periods long and the Off time is two half periods long. These time intervals may be changed within reasonable limits as desired by adjusting the settings of the On and Off voltage dividers 87, 199 and 201.

The frequency determining network in accordance with our invention is discussed above in connection with a seam welder. It is equally as well applicable to the control of a spot welder such as is shown in application Serial No. 52,103, filed September 30, 1948, now Patent No. 2,619,591, to one of us. In particular, the frequency determining circuit disclosed herein may be utilized in place of the frequency determining circuit shown in Figure 3 of the above-entitled application.

While we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. In combination in a frequency determining network for a low frequency welder, a first discharge device connected to initiate the supply of load current of one polarity when conductive; a second discharge device connected to initiate the supply of load current of the opposite polarity when conductive; a flip-flop circuit connected to said devices, initially actuable at random, to permit one of said devices to conduct and to prevent the other of said devices from conducting; On timing means; Off timing means; means actuable by said off timing means to cause the one of said devices which is permitted to be conductive to conduct during an On time and means actuable by said On timing means at the end of the timing cycle thereof for causing said means connected to said devices to permit said other of said devices to conduct and to prevent said one of said devices from conducting.

2. In combination in a frequency determining network for a low frequency welder, a first discharge device connected to initiate the supply of load current of one polarity; a second discharge device connected to initiate the supply of load current of the opposite polarity; a flip-flop circuit connected to said devices, initially actuable at random, to permit one of said devices to perform its function and to prevent the others of said devices from performing its function; On timing means; Off timing means; means actuable by said Off timing means to cause the one of said devices which is permitted to perform its function to function during an On time and means actuable by said On timing means at the end of the timing cycle thereof for causing said means connected to said devices to permit said other of said devices to perform its function and to prevent said one of said devices from performing its function.

3. Apparatus according to claim 2 characterized by switching means operative selectively at the will of an operator (*a*) to permit each of said devices in its turn to perform its function, (*b*) to permit the first device in its turn to perform its function but to prevent said second device in its turn from performing its function, or (*c*) to permit the second device to perform its function but to prevent the first device from performing its function.

4. Apparatus according to claim 2 characterized by means, including two three-way switches having ganged movable contacts operative selectively at the will of an operator (*a*) to permit each of said devices in its turn to perform its function, (*b*) to permit the first device in its turn to perform its function but to prevent said second device in its turn from performing its function or (*c*) to permit the second device to perform its function but to prevent the first device from performing its function.

5. In combination, a first electric discharge device having an anode, a cathode and a control electrode; a second discharge device having an anode, a cathode and a control electrode; first and second terminals adapted to supply a first alternating potential; a third terminal adapted in combination with said first or second terminals to supply a second alternating potential smaller in magnitude than said first potential; a connection between said anode of said first device and said first terminal; a connection between said anode of said second device and said second terminal; a connection between the cathodes of both said devices and said third terminal; a transformer having a primary, a first secondary and a second secondary; connections between said first secondary and said control electrode and cathode of said first device; connections between said second secondary and said control electrode and cathode of said second device; and means for supplying pulses of only one polarity to said primary.

6. In combination, a first electric discharge device having an anode, a cathode and a control electrode; a second discharge device having an anode, a cathode and a control electrode; first and second terminals adapted to supply a first alternating potential; a third terminal adapted in combination with said first or second terminals to supply a second alternating potential smaller in magnitude than said first potential; a connection between said anode of said first device and said first terminal; a connection between said anode of said second device and said second terminal; a connection between the cathodes of both said devices and said third terminal; a transformer having a primary, a first secondary and a second secondary; connections between said first secondary and said control electrode and cathode of said first device; connections between said second secondary and said control electrode and cathode of said second device; a third discharge device including an anode and a cathode; and connections connecting in series said first terminal; said third device, said primary and said third terminal.

7. In combination, a winding having an intermediate tap and a pair of terminal taps; a capacitor-resistor network connected to said intermediate tap; a pair of rectifiers; a connection between the cathodes of said rectifiers and said network; a first resistor connected between the anode of one rectifier and one terminal tap; and a second resistor connected between the anode of the other rectifier and the other terminal tap.

8. In combination, a winding having an intermediate tap and a pair of terminal taps; a capacitor-resistor network connected to said intermediate tap; a pair of rectifiers; a connection between the cathodes of said rectifiers and said network; a first resistor connected between the anode of one rectifier and one terminal tap; a second resistor connected between the anode of the other rectifier and the other terminal tap, a discharge device having a control electrode and a cathode and means connecting said first resistor between said control electrode and cathode.

9. In combination, potential supply means having an intermediate tap and a pair of terminal taps; a capacitor-resistor network connected to said intermediate tap; a pair of rectifiers; a connection between the cathodes of said rectifiers and said network; a first resistor connected between the anode of one rectifier and one terminal tap; a second resistor connected between the anode of the other rectifier and the other terminal tap, a first thyratron having an anode, a cathode and a control electrode; a second thyratron having an anode, a cathode and a control electrode; terminals for supplying a potential; a connection between said cathodes and one of said terminals; connections each including voltage-absorbing means between each anode and another of said terminals; means connecting said first resistor between said control electrodes and said cathodes; and a capacitor connected between said anodes.

10. In combination, potential supply means having a first tap, a second tap and an intermediate tap; a first thyratron having a first anode, a first cathode and a first control electrode; a second thyratron having a second anode, a second cathode and a second control electrode; a connection between said first anode and said first tap; a connection between said second anode and said second tap; a connection between said cathodes and said intermediate tap; a third thyratron having a third anode; a third cathode and a third control electrode; a fourth thyratron having a fourth anode, a fourth cathode and a fourth control electrode; terminals for supplying a potential; first voltage absorbing means connected between said first control electrode and said first cathode; second voltage absorbing means connected between said second control electrode and said second cathode; a first circuit including in series said third anode, said third cathode, said terminals and said first voltage absorbing means; a second circuit including in series said fourth anode, said fourth cathode, said terminals and said second voltage absorbing means; means common to said third and fourth control electrodes to supply a potential thereto capable of rendering the corresponding thyratron conducting and a capacitor connected between said third and fourth anodes.

11. In combination, potential supply means having a first tap, a second tap and an intermediate tap; a first thyratron having a first anode, a first cathode and a first control electrode; a second thyratron having a second anode, a second cathode and a second control electrode; a connection between said first anode and said first tap; a connection between said second anode and said second tap; a connection between said cathodes and said intermediate tap; a third thyratron having a third anode; a third cathode and a third control electrode; a fourth thyratron having a fourth anode, a fourth cathode and a fourth control electrode; terminals for supplying a D. C. potential; first voltage absorbing means connected between said first control electrode and said first cathode; second voltage absorbing means connected between said second control electrode and said second cathode; a first circuit including in series said third anode, said third cathode, said terminals and said first voltage absorbing means; a second circuit including in series said fourth anode, said fourth cathode, said terminals and said second voltage absorbing means; means common to said third and fourth control electrodes to supply a potential thereto capable of rendering the corresponding thyratron conducting and a capacitor connected between said third and fourth anodes.

12. In combination in a frequency determining network for a low frequency welder, a first discharge device connected to initiate the supply of welding current of one polarity when conductive; a second discharge device connected to initiate the supply of welding current of the opposite polarity when conductive; a flip-flop circuit connected to said devices, initially actuable at random, to permit one of said devices to conduct and to prevent the others of said devices from conducting; an On timing network; an Off timing network, a first circuit to be energized for causing said first device to be conductive; and a second circuit to be energized for causing said second device to be conductive; an interconnecting circuit between said first and second circuits and said On and Off timing networks, said interconnecting circuit being responsive to said Off timing network, to energize said first and second circuits, at the end of the Off time, and to said On timing network, to deenergize said first and second circuits at the end of the On time, to cause the one of said devices which is permitted to be conductive to conduct during an On time; and another interconnecting circuit between said On timing network and said switching network actuable by said On timing network at the end of the timing cycle thereof for causing said switching network to permit said other of said devices to conduct and to prevent said one of said devices from conducting.

13. In combination in a frequency determining network for a low frequency welder, a first discharge device connected to initiate the supply of welding current of one polarity; a second discharge device connected to initiate the supply of welding current of the opposite polarity; a flip-flop circuit connected to said devices, initially actuable at random, to permit one of said devices to perform its function and to prevent the others of said devices from performing its function; On timing means; Off timing means; means actuable to cause the one of said devices which is permitted to perform its function by said means connected to said devices to function during an On time; and means actuable by said On timing means at the end of the timing cycle thereof for causing said means connected to said devices to permit said other of said devices to perform its function and to prevent said one of said devices from performing its function and to cause said Off timing means to initiate said Off time.

14. In combination in a frequency determining network for a low frequency welder, a first discharge device connected to initiate the supply of welding current of one polarity; a second discharge device connected to initiate the supply of welding current of the opposite polarity; means connected to said devices, initially actuable at random, to permit one of said devices to perform its function and to prevent the others of said devices from performing its function; On timing means; means actuable to cause the one of said devices which is permitted to perform its function by said means connected to said devices to function during an On time; and means actuable by said On timing means at the end of the timing cycle thereof for causing said means connected to said devices to permit said other of said devices to perform its function and to prevent said one of said devices from performing its function.

15. In combination in a frequency determining network for a low frequency welder, a first discharge device having a main circuit and a control circuit connected to initiate the supply of welding current of one polarity to said welder; a second diescharge device having a main circuit and a control circuit connected to initiate the supply of welding current of the opposite polarity to said welder; a control network having branches respectively in the control circuits of each of said devices and selectively operable to permit one or the other of said devices to function to initiate the supply of current of one polarity or of the opposite polarity; and timing means for actuating said control network to operate selectively as aforesaid to cause said devices to function alternately as aforesaid.

16. In combination in a frequency determining network for a low frequency welder, a first discharge device having a main circuit and a control circuit connected to initiate the supply of welding current of one polarity to said welder; a second discharge device having a main circuit and a control circuit connected to initiate the supply of welding current of the opposite polarity to said welder; a control network having branches respectively in the control circuits of each of said devices and selectively operable to permit one or the other of said devices to function to initiate the supply of current of one polarity or of the opposite polarity; means for actuating said control network to operate selectively as aforesaid to cause said devices to function alternately as aforesaid; and switch means selectively operable at the will of an operator to close both said main circuits, to open the main circuit of the first device and close the main circuit of the second device or to open the main circuit of the second device and close the main circuit of the first device.

17. In combination a first electric discharge device having a main circuit and a control circuit; a second electric discharge device having a main circuit and a control circuit; means associated with said control circuits for selectively controlling the conductivity of said devices; and means selectively operable at the will of an operator for maintaining both said main circuits open, for closing the main circuit of said first device and opening the main circuit of said second device or for closing the main circuit of said second device and closing the main circuit of said first device.

18. In combination a first electric discharge device having a main circuit and a control circuit; a second electric discharge device having a main circuit and a control circuit; first, second and third terminals for supplying potential, said third terminal being adapted to be electrically intermediate between said first and second terminal; means for supplying said main circuit of said first device from said first and third terminals; means for supplying said main circuit of said second device from said second and third terminals; means associated with said control circuits for selectively controlling the conductivity of said devices; and means selectively operable at the will of an operator for maintaining both said main circuits open, for closing the main circuit of said first device and opening the main circuit of said second device or for closing the main circuit of said second device and closing the main circuit of said first device.

19. In combination, a first electric discharge path defined by an anode and a cathode; a second electric discharge path defined by an anode and a cathode; a third electric discharge path defined by an anode and a cathode; a time-constant network; a transformer having a primary and a plurality of secondaries; means for connecting in series the anode and cathode of said first path, the anode and cathode of said second path and said network; means for connecting in series the anode and cathode of said first path, the anode and cathode of said third path and said primary; means for controlling the conductivity of said first path and means for connecting each secondary to a separate utilization circuit.

20. The combination as defined in claim 19 in a frequency determining circuit for a polyphase to single-phase converter which supplies a load characterized by the fact that the secondaries are connected so that the potential supplied thereby initiate the supply of load current of opposite polarities.

21. Apparatus according to claim 20 characterized by a blocking circuit connected to said secondaries counteract alternately the potentials supplied by each of the secondaries.

22. Apparatus according to claim 21 characterized by a blocking circuit which includes a pair of discharge devices connected in a circuit in flip-flop relationship.

23. Apparatus for controlling the duration and the polarity of low frequency pulses transmitted through valve means from a power supply of a higher frequency comprising in combination a first circuit including a first electric discharge device having a pair of principal electrodes and a control electrode; a second circuit including a second electric discharge device having a pair of principal electrodes and a control electrode; means common to both said discharge devices for supplying potential to the control electrodes of both said devices which potential is of a polarity and magnitude tending to render each of said devices conductive; timing means for timing the duration of the supply of said potential; a flip-flop circuit having a first condition of operation and a second condition and including a first terminal at which a first potential is supplied only during said first condition of operation and a second terminal at which a second potential is supplied only during said second condition of operation, and input means for receiving a signal to cause said flip-flop circuit to pass from one of said conditions to the other; means for connecting said control electrode of said first device to said first terminal so that said first potential when present blocks said first device; means for connecting said control electrode of said second device to said second terminal so that said second potential when present blocks said second device; means interconnecting said timing means and said input means for supplying a signal from said timing means at the end of each duration timed by said timing means; means for connecting said first circuit to said valve means to actuate said valve means to transmit a pulse of one polarity when said first device is conductive and means for connecting said second circuit to said valve means to actuate said valve means to transmit a pulse of the opposite polarity when said second device is conductive.

24. In combination a first potential supply terminal; a second potential supply terminal; a third potential supply terminal; said third terminal being adapted to supply a potential intermediate the potentials of said first and second terminals; a capacitor-resistor network connected to said third terminal; a pair of asymmetrically conductive devices each having a first electrode and a second electrode; the first and second electrodes of each said device being similar to the first and second electrodes of said other device; a connection between the first electrodes of said devices and said network; a first resistor connected between the second electrode of one device and said first terminal; a second resistor connected between the anode of said other device and said second terminal; a discharge device having a control electrode and a cathode; and means for connecting said first resistor between said control electrode and cathode.

25. In combination in a timing system a transformer having a primary and a pair of secondaries; a first timing network; a first electric discharge device having an anode and a cathode; means for connecting said anode and cathode in circuit with said primary; additional means for connecting said anode and cathode in circuit with said first network so that said first network may be set for timing by the conduction of said device; a second electric discharge device having an anode, a cathode and a control electrode; means for connecting said first network to said control electrode so that said second device is rendered non-conducting when said first network is set for timing as aforesaid and said second device is permitted to conduct when said network times out; means for connecting said anode and cathode of said second device in circuit with said second network so that said second network is set for timing by the conduction of said second device; and means responsive to said second network and connected to said first device for permitting said first device to conduct when said second network is set for timing and for preventing said first device from conducting when said second network times out.

References Cited in the file of this patent

UNITED STATES PATENTS

| | | |
|---|---|---|
| 2,166,305 | Levoy et al. | July 18, 1939 |
| 2,232,541 | Levoy | Feb. 18, 1941 |
| 2,267,398 | Edwards | Dec. 23, 1941 |
| 2,290,543 | Dawson | July 21, 1942 |
| 2,443,660 | Large | June 22, 1948 |
| 2,476,849 | Ergen | July 19, 1949 |
| 2,498,491 | Heuschkel | Feb. 21, 1950 |
| 2,520,476 | Stanback | Aug. 29, 1950 |